(12) United States Patent
Mallena et al.

(10) Patent No.: US 7,325,070 B1
(45) Date of Patent: Jan. 29, 2008

(54) SUB-APPLICATION LAYER DATA TRANSFER IN A NETWORK COMPRISING A LAYERED ARCHITECTURE

(75) Inventors: Raghu Mallena, San Jose, CA (US); Mark Smith, Cupertino, CA (US); Robert English, Menlo Park, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 1015 days.

(21) Appl. No.: 10/228,499

(22) Filed: Aug. 26, 2002

(51) Int. Cl.
*G06F 13/00* (2006.01)

(52) U.S. Cl. .................. 709/238; 709/227; 709/249

(58) Field of Classification Search .......... 709/217, 709/227, 228, 237, 238, 246, 249, 250
See application file for complete search history.

(56) References Cited

U.S. PATENT DOCUMENTS

| | | | | |
|---|---|---|---|---|
| 5,941,988 | A * | 8/1999 | Bhagwat et al. | 726/12 |
| 6,137,834 | A * | 10/2000 | Wine et al. | 375/240 |
| 7,000,027 | B2 * | 2/2006 | Hensbergen | 709/239 |
| 2002/0085488 | A1 * | 7/2002 | Kobayashi | 370/216 |
| 2002/0112085 | A1 * | 8/2002 | Berg | 709/250 |
| 2002/0120743 | A1 * | 8/2002 | Shabtay et al. | 709/226 |

* cited by examiner

*Primary Examiner*—Viet D. Vu
(74) *Attorney, Agent, or Firm*—Blakely Sokoloff Taylor & Zafman LLP

(57) ABSTRACT

The invention provides a system and a method for splicing network connections. In one embodiment, the method maintains first and second connections with first and second network nodes respectively; and selectively splices the first and second nodes based on application header information associated with inbound data packets received from the first node in reply to a request from the second node.

30 Claims, 8 Drawing Sheets

SUB-APPLICATION LAYER DATA TRANSFER IN A NETWORK COMPRISING A LAYERED ARCHITECTURE

FIELD OF THE INVENTION

This invention relates to networking. In particular, it relates to the splicing of network connections by an intermediate node in a network.

BACKGROUND

Today most computer networks are modeled on a layered network architecture comprising a physical layer at one end, an application layer at the opposite end, and a number of intermediate layers in between. Each layer in the architecture performs services on behalf of the layer above it. Data packets are physically received over a communications medium, for example, an Ethernet cable, in the physical layer and is are processed at each successive layer until it is passed to an application present in the application layer.

In some cases, end nodes in a computer network communicate indirectly via one or more intermediate nodes. For example, a client node may communicate indirectly with a server node via an intermediate proxy or gateway node. "Nodes" could also be peers in a peer-to-peer configuration.

While there may be definite advantages in end nodes communicating via an intermediate node (for example, the intermediate node may perform certain value-added functions and services on behalf of one of the end nodes), there are also overheads. These overheads may include, in the case of an intermediate proxy node bridging communications between two end nodes, the overhead of setting up a communications link, or "pipe," between each end node and the proxy node. This involves steps such as the exchange of identification and configuration information (hand shaking) and processing of the data in each of the intermediate layers before passing it to the application layer. A result of such processing is that multiple copies of the data are made in the application and intermediate layers.

These overheads may be justified in view of the value-added services performed by the intermediate node. However, sometimes the intermediate node does not perform any value-added services but acts merely as a conduit for the data.

In this latter scenario, there is no need for the data to be sent from the physical layer all the way up to the application layer. Instead, a technique called splicing allows the intermediate node to forward data packets between the end nodes such that processing of the data packet is confined to a lower level below the application layer in the network architecture. For example, in the case of the Open Systems Interconnect (OSI) network architecture model, the processing is confined to the interface between the Transmission Control Protocol (TCP) and Internet Protocol (IP) layers.

One problem with existing splicing techniques is that an intermediate node is configured to splice communications before actually receiving the data packets. It may be that the nature of the data is such that an application in the application layer may be able to perform value-added services on the data. However, since the intermediate node has already been set up to splice communications, the data would not be passed to the application which is then unable to perform the value-added services.

SUMMARY

In one embodiment, the invention provides a method for transferring data in a network comprising a layered architecture. The method comprises maintaining first and second connections with first and second network nodes respectively; and selectively splicing the first and second connections based on application header information associated with inbound data packets received from the first node in response to a message from the second node.

DETAILED DESCRIPTION

Figure 1:
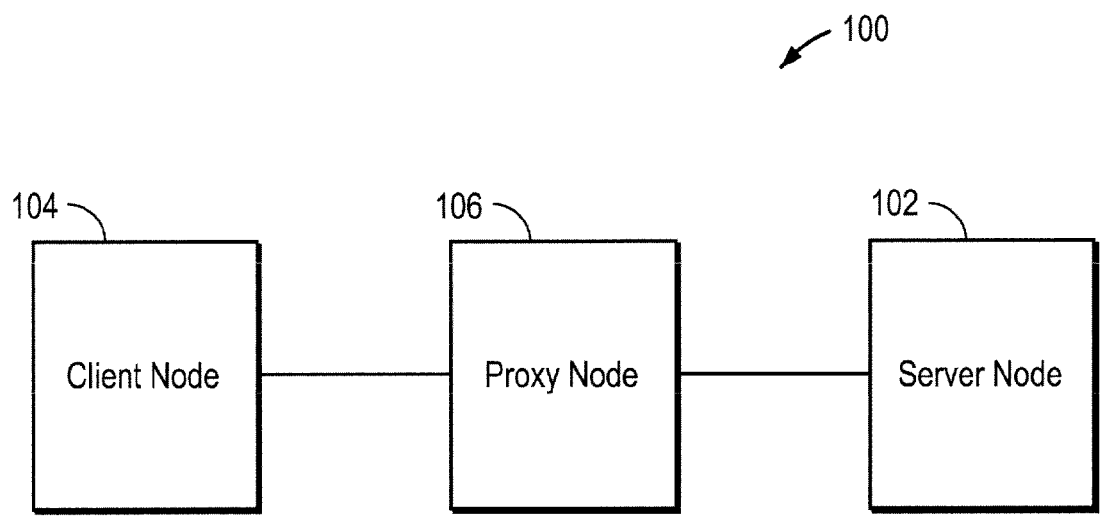
FIG. 1 shows a network topology within which embodiments of the present invention may be practiced.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

According to techniques disclosed herein there is provided a method and system for splicing first and second network connections wherein the first network connection is with a first node, and the second network connection is with a second node. The splicing involves setting a low-level pipe at a level between a physical layer and an application layer in a layered network architecture model. For example, in the case of the Open System Interconnect (OSI) architecture model (which will be used to describe the present invention in a non-limiting way), the low-level pipe is defined at the interface between the Transmission Control Protocol (TCP)

and the Internet Protocol (IP) layers. According to the techniques disclosed herein, the low-level pipe is defined dynamically by examining incoming data from the first node and deciding whether or not to splice the connections based on the data itself.

One advantage of the present invention is that it allows splicing in some cases and not in others, based on the actual data received from the first node. Thus, in some cases, if an application, such as a web caching application, decides that the data received from the first node can be cached, then the application will instruct an operating system kernel below the application to forward all data packets to the application for caching.

However, if the application decides, for example from header information received from the first node, that the data is of such a nature that it is not suitable to caching (for example, the data could be data providing stock price information), then the application instructs the operating system kernel to proceed in a "splice state" wherein the operating system makes appropriate modifications to the data packets received from the first node and forwards the data packets on a second connection with a second or destination node. In some cases, when processing in the splice state, the operating system kernel filters certain error messages received from the first node by taking appropriate action based on the error message and preventing the propagation of the error message to the second node.

Further, in some embodiments, the operating system modifies an error control or data validation number, for example a checksum, received from the first node based on changes made by the operating system to header information associated with the data packets during splicing. Since a mere modification of the data validation number is performed, as opposed to a recalculation of the entire data validation number, a significant amount of processing time is saved.

Referring now to FIG. 1 of the drawings, reference numeral 100 generally indicates a network topology within which embodiments of the present invention may be practiced. The network topology 100 includes a first node in the form of a server node 102 connected to a second node in a form of a client node 102 via an intermediate node in the form of a proxy node 106. The actual components which make up the proxy node 106 will be described in greater detail below.

Figure 2:
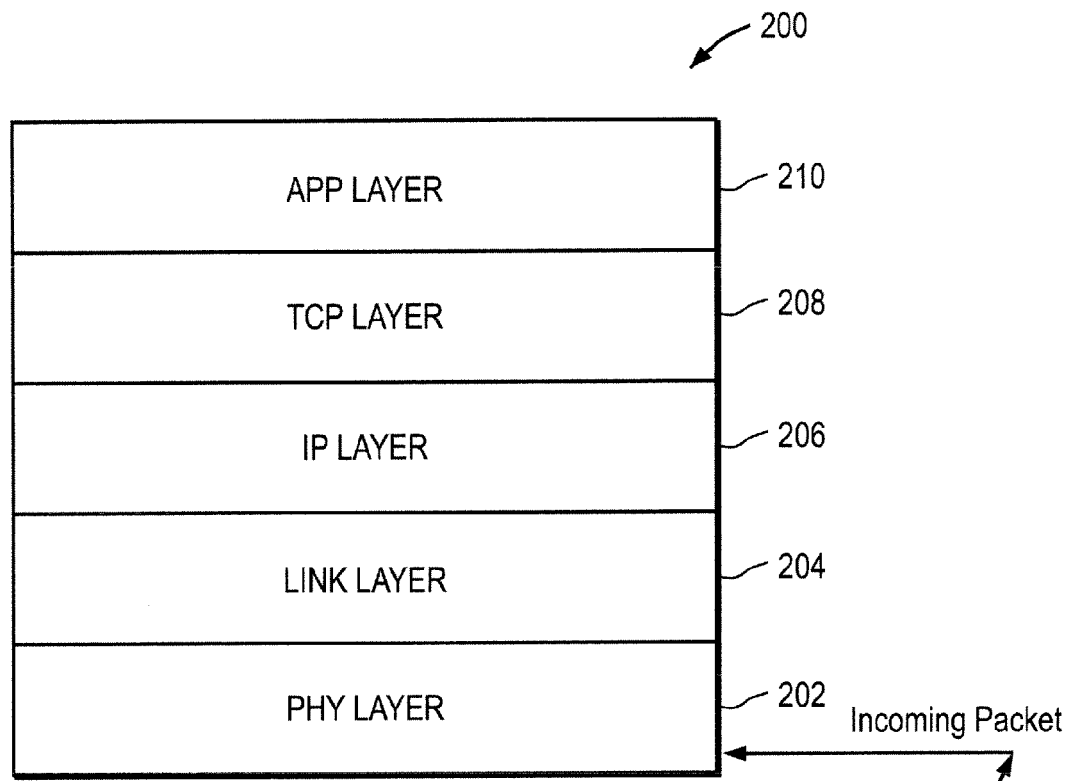
FIG. 2 shows a block diagram of the various layers making up a network architecture modeled in accordance with the OSI network architecture model.

The network topology 100 follows a layered architecture model which, according to one embodiment of the invention, is modeled on the Open Systems Interconnect (OSI) network architecture model 200 shown in FIG. 2 of the drawings. Referring to FIG. 2, the model 200 includes a physical layer 202 within which various communications interfaces to physically receive data packets are defined. In one embodiment, the physical layer 202 may provide an interface to, for example, an Ethernet cable over which data packets may be received.

Figure 3:
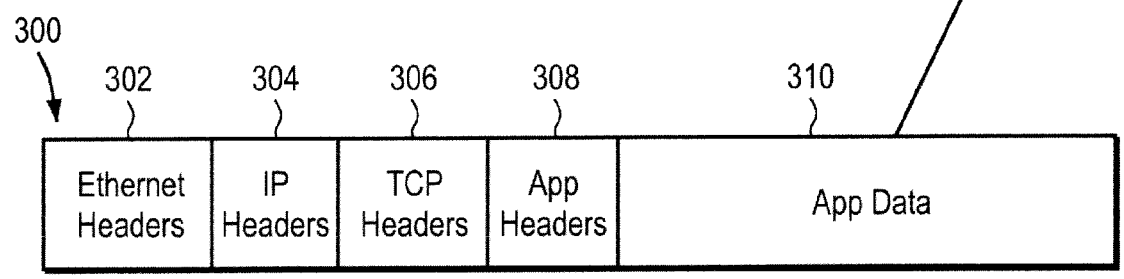
FIG. 3 shows the various components of a typical data packet.

FIG. 3 shows the various components of a typical data packet 300. As can be seen, the data packet 300 includes Ethernet headers 302, IP headers 304, TCP headers 306, application headers 308, and application data 310. The Ethernet headers 302 are stripped off the data packet 300 at the link layer 204.

The model 200 also includes, a link layer 204 and an Internet protocol (IP) layer 206 which remove the IP headers 304 from the data packet 300 for further processing. The model 200 also includes a Transmission Control Protocol (TCP) layer 208 that is responsible for processing the TCP header 306, in the data packet 300. Finally, the model 200 includes an application layer 210 wherein an application such as a browser, or a web caching application, etc. may reside. The application layer 210 is responsible for processing the application headers 308 within the data packet 300 as well as the application data 310. In the case of a browser application, the application headers may comprise HTTP headers and the application data may comprise HTTP data.

Figure 4:
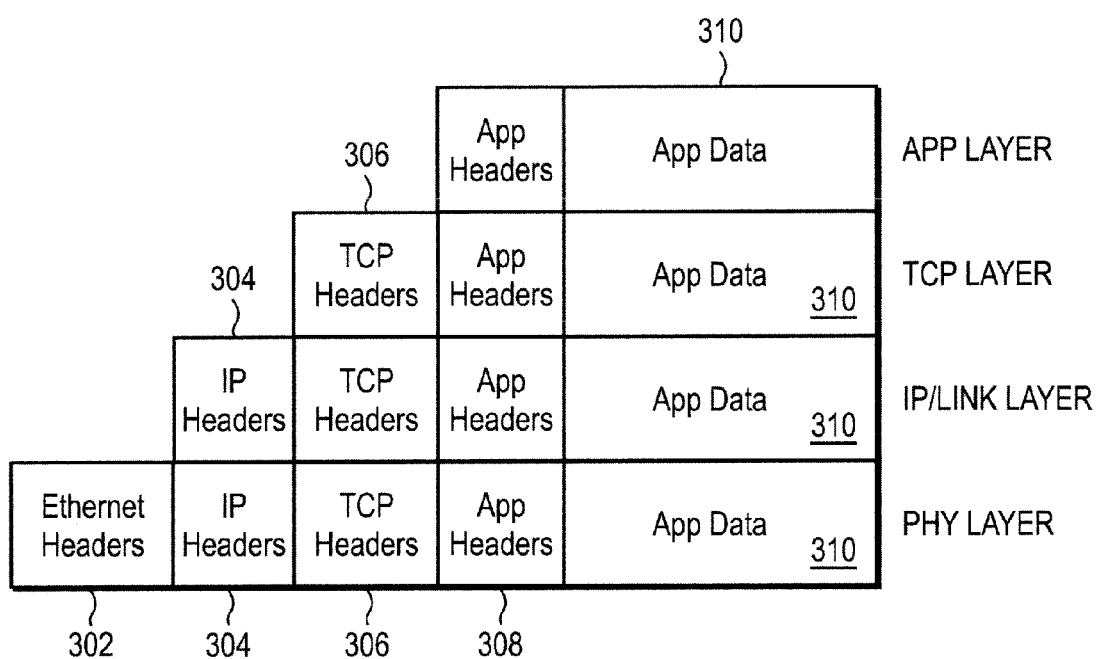
FIG. 4 shows a schematic drawing which illustrates how a data packet is processed by the various layers in a network modeled on the OSI network architecture model.

FIG. 4 of the drawings illustrates how a data packet 300 is processed by the various layers in the network architecture model 200. Referring to FIG. 4, the physical layer 202 receives the entire data packet 300 including the Ethernet headers 302, the IP headers 304, the TCP headers 306, the application headers 308 and the application data 310. After processing the Ethernet headers 202, the physical layer 302 passes the remaining data packets to the IP/link layers 206/204. Thus, the IP/link layers 206/204 receive a data packet comprising only the IP headers 304, the TCP headers 306, the application headers 308, and the application data 310.

After processing the IP headers 304, the data packet is sent to TCP layer 208 for processing. The TCP layer 208 processes the TCP headers 306 and sends a data packet comprising only the application header 308 and the application data 310 to the application layer 210. As will be seen below, the application headers 308 are used by an application in the application layer 210 to decide whether or not to splice the data.

Figure 5:
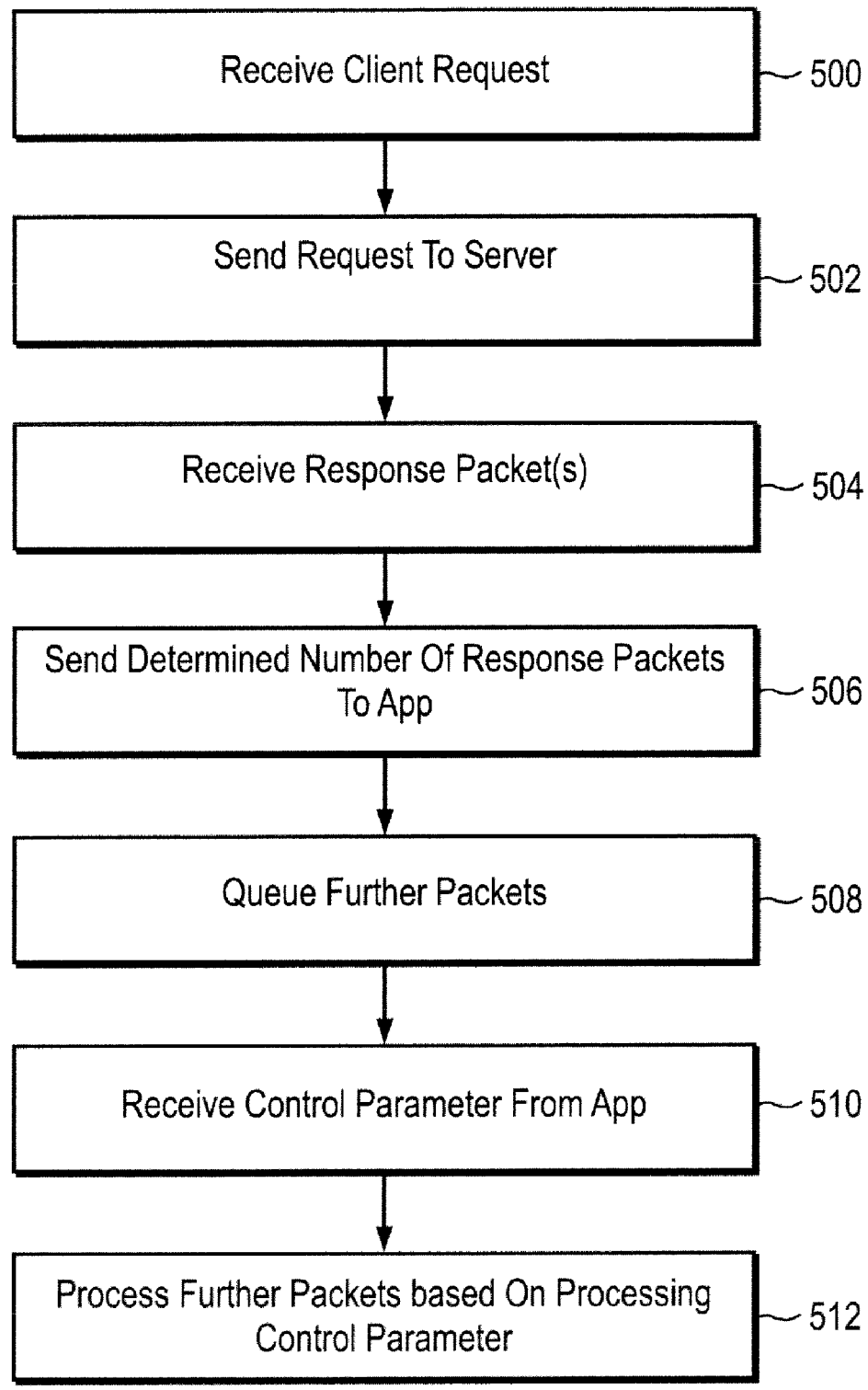
FIG. 5 shows a flow chart of operations performed by proxy nodes in order to perform splicing in accordance with one embodiment of the invention.

FIG. 5 of the drawings shows a flow chart of operations performed by the proxy node 106 in order to splice a first connection with server node 102 with a second connection with the client node 104. Referring to FIG. 5 at block 500, the proxy node 106 receives a request from the client node 104. At block 502, the proxy node 106 sends the request to the server node 102. At block 504, the proxy node 106 receives a response comprising the data packets 300 from the server node 102. At block 506, the proxy node 106 sends a determined number of the received data packets 300 to an application in the application layer 210. More specifically, an operating system kernel operating between the application layer 210 and the physical layer 202 sends the determined number of packets to the application layer 210. The actual number of data packets that is sent is determined by an application, for example a web caching application in the application layer 210.

In one embodiment, the application in the application layer 210 instructs the operating system kernel to send the first data packet 300 received from the server node 102. If the application headers 308 in the first data packet 300 indicates to the application that the application headers 308 span more than one data packet 300, then the application instructs the operating system kernel to send the next data packet. In this way, the application continues to instruct the operating system kernel to send the next data packet 300 until all the application headers 308 have been received.

In an alternative embodiment, if advance knowledge of the number of data packets 300 that comprise the application headers 308 is known, then the application instructs the operating system kernel, in advance, to send only that number of the data packets 300.

At block 508, the operating system kernel queues all further data packets 300. Thus, only those data packets 300 containing application header information 308 are sent to the application, while the remaining data packets 300 are queued. At block 510 the operating system kernel receives a control parameter set by the application which specifies how to process the queued data packets 300 and any further data packets 300 received from the server node 102. At block 512, the operating system kernel processes the further packets 300 based on the control parameter.

In one embodiment, the control parameter may cause the operating system kernel to simply send all queued data packets 300 and any further data packets 300 received during a current communications session with the server node 102, to the application. One scenario where this may occur is where the application identifies opportunities to perform certain value-added services using the application data 310. For example, the application may decide to cache the application data 300 or to perform a virus check on the application data 310.

In other cases, the application may decide that the nature of the application data 310 received from the server node 102 is such that no value-added service is to be performed. For example, the application data 310 may relate to content that changes rapidly such as, stock market prices, or headline news. In such cases, the application, which could be a web caching application, might decide that the application data 310 is not to be cached. Thus, in these cases, the control parameter causes the operating system kernel to go to a splice mode in which the connections with the server node 102 and the client node 104 are spliced. In the splice mode, all queued data packets 300 and any further data packets 300 received during the current communications session with the server node 102 are simply forwarded at a level below the application layer 210 in the layered network model 200 to the client node 104. In the case, where the network model is the OSI model, in one embodiment, the splicing occurs at the interface between the IP and TCP layers 208 and 206, respectively.

Various techniques may be used to implement the splice. In one embodiment, header information for each received or inbound data packet 300 from the server node 102 is modified so that the source of the data packet 300 is identified as the proxy node 106 and the destination of the data packet 300 is identified as the client node 104.

Figure 6:
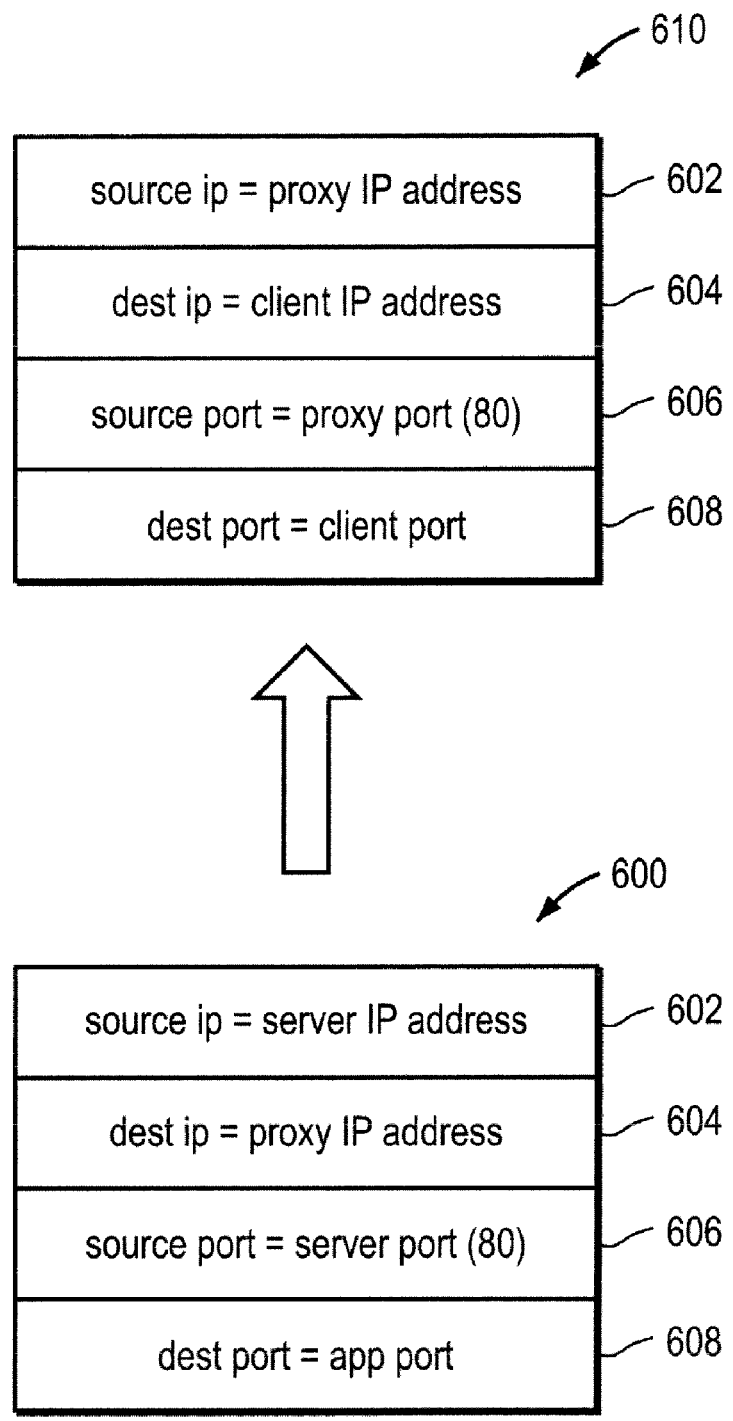
FIG. 6 shows the components of a TCP/IP header.

FIG. 6 of the drawings shows one embodiment of how such a modification or transformation may take place in the case of a network architecture model based on the OSI network architecture model 200 shown in FIG. 2 of the drawings.

Referring to FIG. 6, reference numeral 600 generally indicates TCP/IP header information for a data packet 300 sent from the server node 102 to the proxy node 106. The TCP/IP header information 600 includes a source IP address 602 which is set to an IP address of the server node 102, a destination IP address 604 which is set to an IP address of the proxy node 106, a source port 606 which is set to a port of the server node 102 which is used to send the data packet 300. Typically, this port is a standard port such as port 80. The TCP/IP header information 600 further includes a destination port 608 which is set to a port of the proxy node 106 which is used to receive the data packet 300. The actual values making up TCP/IP header 600 are obtained during a hand shaking operation between the proxy node 106 and the server node 102.

As a result of the transformation or modification in accordance with the teachings of the present invention, the TCP/IP header 600 is transformed into TCP/IP header 610. As can be seen, in the TCPIP header 610, the source IP address 602 is set to the IP address of the proxy node 106, the destination IP address 604 is set to the IP address of client node 104, the source port 606 is set to a port of the proxy node 106 which will be used to transmit the data packets 300, which in this case is the port 80. Finally, the destination port 608 is set to a port of the client node 104 which will be used to receive the data packets 300.

Associated with the transmission the data packets 300 is a sequence number (not shown) which is a number that identifies a particular data packet 300 in a sequence of data packets 300 comprising a reply being sent by the server node 102 to the proxy node 106. In one embodiment, this sequence number is also transformed to a corresponding sequence number from a sequence number space identifying data packets sent from the proxy node 106 to the client node 104. Thus, when the TCP/IP header 600 is transformed or modified to become the TCP/IP header 610, and a data packet 300 comprising the TCP/IP header 610 is sent to the client node 104, the client node 104 has no knowledge of the server node 102 and is aware only of the proxy node 106.

Another aspect of operating in splice mode is that acknowledgements of data packets sent by the client node 104 to the proxy node 106 are transformed to corresponding acknowledgements from an acknowledgement number space for the connection between the proxy node 106 and the server node 102. Thus, when the server node 102 receives an acknowledgement data packet 300, it is as if the acknowledgement data packet 300, was sent by the proxy node 106 instead of by the client node 102.

A further aspect of splicing in accordance with the present invention is that a data validation or error control number (not shown), which in one embodiment is a checksum bit, is calculated by the server node 102 and sent to the proxy node 106 is modified by adjusting the data validation number based on changes to TCP/IP header 600. It is important to note that the entire validation number is not recalculated, but rather a simple adjustment is performed which is computationally less intensive than having to calculate the entire validation number. An example, of a validation number is TCP/IP checksum which is sent as an error control bit during transmission of the data packets.

In another embodiment, in addition to modifying the TCP/IP headers, splicing also includes preventing error messages sent from the server node 102 from reaching the client node 104. In this embodiment, the operating system kernel is configured with predefined rules that control its response to error messages received from server node 102. For example, if an error message is received from the server node 102 to cause the client node 104 to reset its connection with the server node 102, then the operating system kernel in the proxy node 106 is configured to prevent the reset message from being sent to the client node 104. Instead, the operating system kernel causes the connection between the proxy node 106 and the server node 102 to be reset. In this way the connection between the client node 104 and the proxy node 106 is kept alive and the overhead in having to reset the connection is avoided.

In other embodiments, after all data has been sent by the server node 102, the server node 102 sends a FIN message which essentially indicates to proxy 106 that the last byte in the reply has been sent. The operating system kernel is configured, in this case, not to terminate the connection between the proxy node 106 and the server node 102 but to keep the connection between client node 104 and proxy node 106 alive for a predefined time period. This is done so that if the client node 104 wishes to send a further request to the proxy node 106, the connection between the client node 104 and the proxy node 106 may be used without having to re-establish the connection. This also avoids the overhead of having to re-establish a connection between the client node 104 and proxy node 106.

Figure 7:
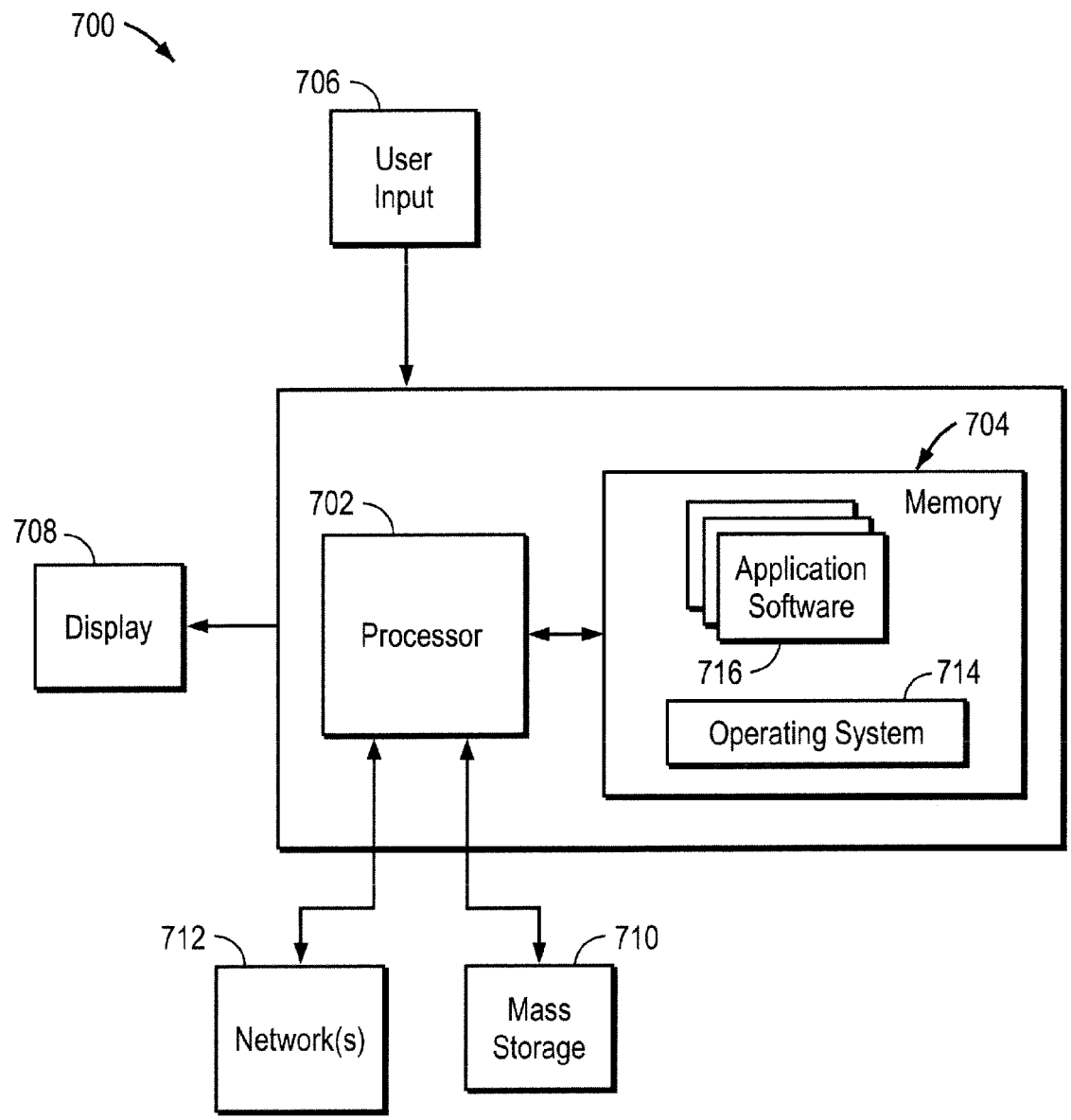
FIG. 7 shows a block diagram of the components that may be used to implement a proxy node in accordance with one embodiment of the invention.

FIG. 7 of the drawings shows a high-level block diagram of a system which may be used to implement the proxy node 106. Processing system 700 typically includes at least one processor 702 coupled to a memory 704. The processor 702 may represent one or more processors (e.g. microprocessors), and the memory 704 may represent random access memory (RAM) devices comprising a main storage of the system 700, as well as any supplemental levels of memory e.g., cache memories, non-volatile or back-up memories (e.g. programmable or flash memories), read-only memories, etc. In addition, the memory 704 may be considered to include memory storage physically located elsewhere in the system 700, e.g. any cache memory in the processor 702, as well as any storage capacity used as a virtual memory, e.g., as stored on a mass storage device 710 or on another computer coupled to the system 700 via a network 712.

The processing system 700 also typically receives a number of inputs and outputs for communicating information externally. For interface with a user or operator, the system 700 typically includes one or more user input devices 706 (e.g., a keyboard, a mouse, etc.) and a display 708 (e.g., a CRT monitor, a LCD panel). However, with some implementations of the system 700 user input and output may not be required, such that user input devices 706 and display 708 may be omitted.

For additional storage, the system 700 may also include one or more mass storage devices 710, e.g., a floppy or other removable disk drive, a hard disk drive, a Direct Access Storage Device (DASD), an optical drive (e.g. a CD drive, a DVD drive, etc.) and/or a tape drive, among others. Furthermore, the system 700 may include an interface with one or more networks 712 (e.g., a land, a WAN, a wireless network, and/or the Internet among others) to permit the communication of information with other computers coupled to the networks. It should be appreciated that the system 700 typically includes suitable analog and/or digital interfaces between the processor 702 and each of the components 704, 706, 708 and 712 as is well known in the art.

The processing system 700 operates under the control of an operating system 714, and executes various computer software applications, components, programs, objects, modules, etc. Moreover, various applications, components, programs, objects, etc. may also execute on one or more processors in another computer coupled to system 700 via a network 712, e.g. in a distributed computing environment, whereby the processing required to implement the functions of a computer program may be allocated to multiple computers over a network.

In general, the routines executed to implement the embodiments of the invention, may be implemented as part of an operating system or a specific application, component, program, object, module or sequence of instructions referred to as "computer programs". The computer programs typically comprise one or more instructions set at various times in various memory and storage devices in a computer, and that, when read and executed by one or more processors in a computer, cause the computer to perform these steps necessary to execute steps or elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of signal bearing media used to actually perform the distribution. Examples of signal bearing media include but are not limited to recordable type media such as volatile and non-volatile memory devices, floppy and other removable disks, hard disk drives, optical disks (e.g. CD ROMS, DVDs, etc.), among others, and transmission type media such as digital and analog communication links.

Figure 8:
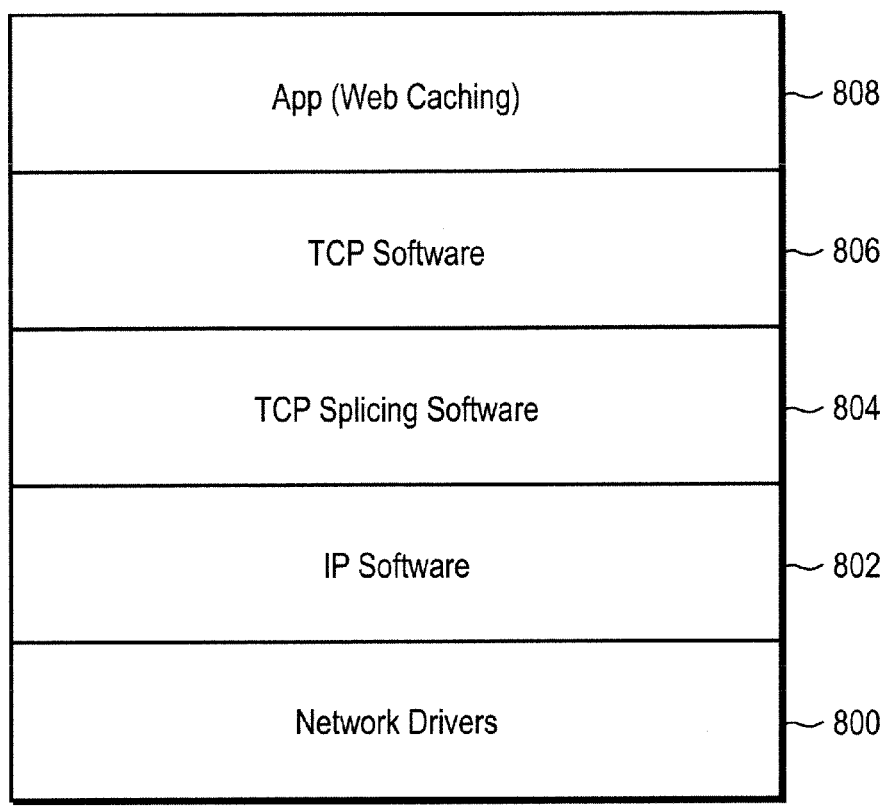
FIG. 8 shows a hierarchical view of software loaded in the system of FIG. 7.

FIG. 8 of the drawings shows a hierarchical view of software loaded in the system 700. Referring to FIG. 8, it will be seen that the for system 700 includes network drivers 800 which includes software to send and receive bits over the physical layer 202. The software further includes IP software 802, and TCP software 806 together process the TCP/IP header information as described. The software further includes splicing software 804 which performs the various splicing operations described above. The TCP software 806, the TCP splicing software 804, the IP software 802 and the network drivers 800 form part of the operating system 714. The software further includes an application, for example a web caching application 808.

Figure 9:
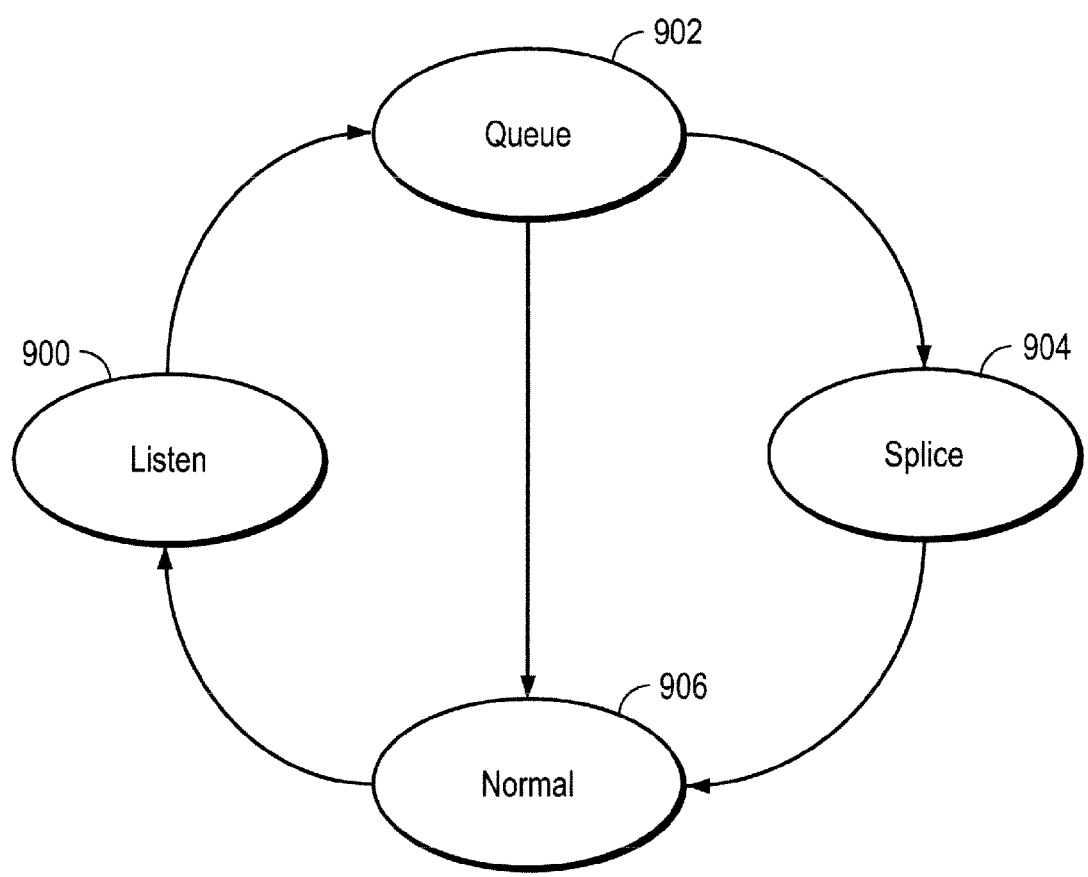
FIG. 9 shows a state diagram for the system of FIG. 7.

FIG. 9 shows a state diagram for the system 700. As will be seen, the system 700 includes a listen state 900, a queue state 902, a splice state 904 and a normal state 906. System 700 starts in listen state 900 in which it "listens" for incoming data packets 300 from the server node 102. If the incoming data packets 300 are received from the server node 102, then the system 700 sends the first or predefined number of the data packets 300 to an application in the application layer 210.

Thereafter, the system 700 enters the queue state 902 in which it queues all the remaining data packets 300 pending a decision from the application on how to process the queued data packets 300 as well as any further received data packets 300. If the application sends a control parameter indicating that the queued and any further received data packets 300 are to be spliced, then the system 700 enters the splice state 904 wherein a low-level or splice connection between the client node 104 and the server node 102 is setup as previously described.

Alternatively, if the application indicates that no splicing is required then the queued data packets are flushed up to the application layer 210 and the system 700 enters the normal state 906 wherein incoming data packets from the server node 102 are sent to the application layer 210. It is possible for the system 700 to enter the normal state 906 directly from the splice state 904 if, for example, the connection between the proxy node 106 and the server node 102 is terminated, or if an error message is received from the server node 102, for example, a message indicating that the connection between the proxy node 106 and the server node 102 is to be reset.

The system 700 may continue in the splice state 904 until a predefined criterion set by the application in the application layer 210 has been satisfied. For example, the predefined criterion may specify that splicing is to continue for a fixed length of bytes received from the server node 102 or for a duration of the current communication session between the proxy node 106 and the server node 102.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method for transferring data in a network comprising a layered architecture, the method comprising:

maintaining first and second connections with first and second network nodes, respectively;

sending a predefined number of inbound data packets, received from the first node in response to a message from the second node, to an application in an application layer, while queuing a remainder of the inbound data packets at an intermediate layer below the application layer pending a decision by the application on whether to splice the first and second connections; and selectively splicing the first and second connections based on application header information associated with one or more of the inbound data packets.

2. The method of claim 1, wherein selectively splicing comprises splicing based on a criterion set by the application.

3. The method of claim 2, wherein the criterion comprises splicing the first and second connections for a predefined number of inbound data packets received from the first node.

4. The method of claim 3, wherein the criterion comprises splicing the first and second connections for a duration of a current communications session between the first and second nodes.

5. The method of claim 4, wherein selectively splicing comprises adjusting a precalculated validation number based on changes to header information in the inbound data packets during splicing.

6. The method of claim 5, wherein selectively splicing further comprises performing predefined actions based on defined messages in the inbound data packets.

7. The method of claim 6, wherein the predefined actions comprise keeping the second connection open when the defined message is a reset message.

8. The method of claim 7, wherein the predefined action comprises keeping a second connection open when the defined message is a message indicating that all inbound data packets comprising the reply have been received.

9. A method for processing data at an intermediate node bridging communications between first and second nodes in a network comprising a layered architecture, in which a physical layer is separated from an application layer by a plurality of intermediate layers, the method comprising:

using a listen state for an operating system kernel below the application layer to detect incoming data packets;

receiving a plurality of data packets at the physical layer from the first node via a first connection between the intermediate node and the first node;

sending a predetermined number of the plurality of data packets to the application layer;

queuing a remaining number of the plurality of data packets after said predetermined number of the plurality of data packets, at a level below the application layer;

analyzing application header information in the predetermined number of data packets and setting a control parameter based on the header information in the application layer;

sending the control parameter to the operating system kernel; and deciding within the operating system kernel whether to send the queued data packets to the application layer or to instead forward the queued packets to the second node via a second connection existing between the intermediate node and the second node, based on the control parameter.

10. The method of claim 9, wherein setting the control parameter comprises setting the control parameter to cause the operating system kernel to enter a splice state in which the first connection is spliced with the second connection.

11. The method of claim 10, wherein setting the control parameter further comprises setting the control parameter to specify a condition in which the operating system kernel returns from the splice stated to a normal state in which the received data packets are sent to the application layer for processing.

12. The method of claim 11, wherein the condition comprises a length of time after which the operating system kernel returns to the normal state.

13. The method of claim 11, wherein the condition comprises a number of bytes from the first node to process in the splice state before returning to the normal state.

14. The method of claim 11, wherein the condition comprises a subset, of a number space identifying each data packet, to process in the splice state before returning to the normal state.

15. The method of claim 14, wherein processing the data packets comprises entering the splice state and processing the queued data packets and any additional data packets from the first node while in the splice state including modifying source and destination header information in each data packet such that information about the first node is transformed to corresponding information about the intermediate node and information about the intermediate node is transformed to corresponding information about the second node; and forwarding the modified data packets to the second node, via the second connection.

16. The method of claim 15, wherein processing the data packets while in the splice state further comprises modifying an error control value calculated by the first node including changing the error control value based on the modifications to the source and destination information.

17. The method of claim 9, wherein processing the data packets comprises sending the queued data packets and any additional data packets from the first node to the application layer.

18. The method of claim 17, further comprising configuring the operating system with rules on how to process error messages from the first node.

19. The method of claim 18, wherein the rules include a rule to keep the second connection open when a request to reset the connection is received from the first node while resetting the first connection.

20. The method of claim 19, wherein the rules further comprise a rule to keep the first connection open for a predefined length of time after all data packets from the first node have been received.

21. A computer-readable storage medium having stored thereon a sequence of instructions which when executed by a system bridging communications between first and second nodes in a network comprising a layered architecture, in which a physical layer is separated from an application layer by a plurality of intermediate layers, cause the system to perform a method comprising:

using a listen state for an operating system kernel below the application layer to detect incoming data packets;

receiving a plurality of data packets at the physical layer from the first node via a first connection between the system and the first node;

sending a predetermined number of the plurality of data packets to the application layer;

queuing a remaining number of the plurality of data packets after said predetermined number of the plurality of data packets, at a level below the application layer;

analyzing application header information in the predetermined number of data packets and setting a control parameter based on the header information in the application layer;

sending the control parameter to the operating system kernel; and deciding within the operating system kernel whether to send the queued data packets to the application layer or to instead forward the queued packets to the second node via a second connection existing between the system and the second node, based on the control parameter.

22. The computer-readable medium of claim 21, wherein setting the control parameter comprises setting the control parameter to cause the operating system kernel to enter a splice state in which the first connection is spliced with the second connection between the system and the second nodes.

23. A computer-readable storage medium having stored thereon a sequence of instructions which when executed by a computer cause the computer to perform a method for transforming data in a network comprising a layered architecture, the method comprising:

maintaining first and second connections with first and second network nodes, respectively;

sending a predefined number of inbound data packets, received from the first node in response to a message from the second node, to an application in an application layer, while queuing a remainder of the inbound data packets at an intermediate layer below the application layer pending a decision by the application on whether to splice the first and second connections; and selectively splicing the first and second connections based on application header information associated with one or more of the inbound data packets.

24. A system for transferring data in a network comprising a layered architecture, the system comprising:

a communications interface to maintain first and second connections with first and second network nodes, respectively; and an operating system, which functions as an intermediate layer below an application layer in said system, to send a predefined number of inbound data packets, received from the first node in response to a message from the second node, to an application in the application layer, while queuing a remainder of the inbound data packets in the operating system pending a decision by the application on whether to splice the first and second connections; wherein the operating system is further to selectively splice the first and second connections based on application header information associated with one or more of the inbound data packets.

25. A network node comprising:

a processor; and a memory coupled to the processor, the memory storing instructions which were executed by the processor cause the network node to perform a method comprising:

maintaining first and second connections with first and second network nodes, respectively;

sending a predefined number of inbound data packets, received from the first node in response to a message from the second node, to an application in an application layer, while queuing a remainder of the inbound data packets at an intermediate layer below the application layer pending a decision by the application on whether to splice the first and second connections; and selectively splicing the first and second connections based on application header information associated with inbound data packets received from the first node in response to a message from the second node.

26. A method comprising:

at an intermediate network node, maintaining a first connection with a first network node and a second connection with a second network node; and deciding in the intermediate network node whether to splice the first connection with the second connection based on application-level information contained within data received by the intermediate network node from the first network node over the first connection, wherein said data received by the intermediate network node has been sent by the first network node to the intermediate network node in response to a request from the second network node, and wherein said deciding whether to splice the first connection with the second connection includes using an application layer in the intermediate network node to decide whether to splice the first connection with the second connection, based on the application-level information, and determining whether subsequent data responsive to said request from the second network node should be passed to the application layer or instead forwarded to the second network node.

27. A method as recited in claim 26, wherein the application-level information comprises application header information in one or more data packets received from the first network node.

28. A method as recited in claim 27, wherein deciding whether to splice the first and second connections comprises:

sending a specified number of a plurality of inbound data packets to an application in an application layer in the intermediate network node, while queuing a remainder of the plurality of inbound data packets at an intermediate layer below the application layer pending a decision by the application on whether to splice the first and second connections.

29. A method as recited in claim 28, wherein said deciding whether to splice the first and second connections is done based on a criterion set by the application.

30. A system as recited in claim 24, wherein the system has a first connection with the first node and a second connection with a second node, and wherein the operating system processes the queued data packets and additional data packets received from the first node based on the control parameter by deciding, based on the control parameter, whether to send the queued data packets to the application layer or to instead forward the queued packets to the second node via the second connection.

* * * * *